United States Patent [19]

Borda

[11] 4,385,896
[45] May 31, 1983

[54] SPLIT COUPLING

[76] Inventor: Eduardo R. Borda, 2701 Common St., Lake Charles, La. 70601

[21] Appl. No.: 238,823

[22] Filed: Feb. 27, 1981

[51] Int. Cl.³ .............................................. F16D 3/00
[52] U.S. Cl. ...................................... 464/76; 464/73
[58] Field of Search ..................................... 464/73–76

[56] References Cited

U.S. PATENT DOCUMENTS

| | | | |
|---|---|---|---|
| 1,262,151 | 4/1918 | Werner | 464/76 |
| 1,791,763 | 2/1931 | Peters | 464/76 |
| 2,004,077 | 6/1935 | McCartney et al. | 464/76 |
| 2,116,195 | 5/1938 | Foster | 464/76 |

Primary Examiner—John Petrakes

[57] ABSTRACT

A coupling between two shafts, that can be readily disassembled therefrom, without disturbing the shafts, the coupling including two semi-circular members held clamped around each one of the shafts, each member having a singular, axially projecting, eccentrically located tooth, the four teeth intermeshing together, and also with a rubber shoe, that absorbs any momentum shock between the teeth.

1 Claim, 5 Drawing Figures

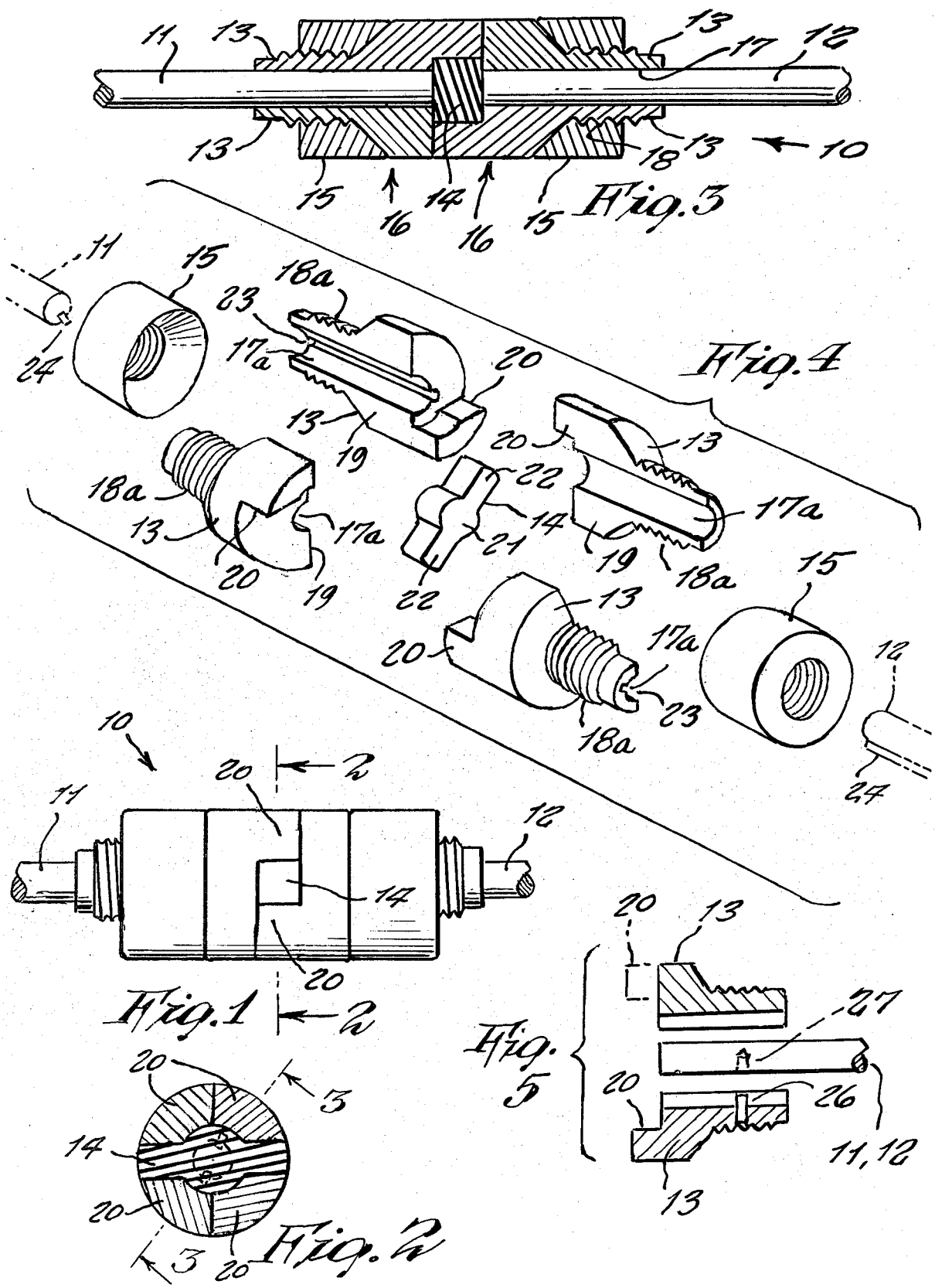

SPLIT COUPLING

This invention relates generally to shaft couplings.

It is well known that conventional shaft couplings cannot be readily installed, or removed from between shafts, without the necessity of disturbing the precise position of either one, or both, of the shafts. This is an objectionable situation, and is, accordingly, in need of an improvement.

Therefore, it is a principal object of the present invention to provide a split coupling, which can be quickly and readily installed, or removed from between shafts, without the necessity of disturbing the precise positions of either, or both, of the shafts.

Yet another object is to provide a split coupling, that includes shock-absorbing means, in case of a speed momentum difference occurring between the shafts.

Other objects of the present invention are to provide a split coupling, which is simple in design, inexpensive to manufacture, rugged in construction, easy to use and efficient in operation.

These, and other objects, will be readily evident, upon a study of the following specification, and the accompanying drawing, wherein:

FIG. 1 is a side elevation view of the assembled, split coupling;

FIG. 2 is a transverse cross-sectional view, on line 2—2 of FIG. 1;

FIG. 3 is a side cross-sectional view, on line 3—3 of FIG. 1;

FIG. 4 is a perspective, exploded view of the split coupling components, shown in relative positions for being assembled together; and FIG. 5 is a view showing a design of split coupling that includes a radial pin, instead of key and keyway, for securement to a shaft.

Referring now to the drawing in greater detail, the reference numeral 10 represents a split coupling, according to the present invention, for connecting together two shafts 11 and 12.

The split coupling includes four semi-cylindrical members 13, a shock absorbing shoe 14 and two circular sleeves 15.

A pair of the members 13 are placed against opposite sides of each of the shafts, so that, together, the two members form a unit 16, having a central hole 17 receiving the shaft, and also, together, form a spiral screw thread 18 therearound, for engaging a threaded opening of sleeve 15, that serves to retain the two members together. Accordingly, each member includes a semi-cylindrical opening 17a, and a half thread 18a. A flat face 19, of one member, abuts a flat face 19 of the other.

Each of the members 13 includes a single tooth 20, projecting axially from one end thereof; the tooth being eccentrically positioned. As shown, the tooth may be made adjacent the flat face 19, so that one side of the tooth is a continuation of the flat face. As shown, it is to be noted, that each of the members are made to be, and to look, identically the same.

The shoe 14 is molded of a rubber material, that is resilient, in order to serve as a shock-absorber. It includes a circular central portion 21, and a pair of opposite extending teeth 22. The thickness of the shoe is the same as the axial length of each tooth 20; the thickness of the show central portion being such, that it fits between the ends of the shafts.

One of the members 13, of each unit 16, may include a keyway 23, for receiving a key 24 engaged in a keyway 25 of the shaft, as shown in FIG. 4. Alternately, such member may be fitted with a radially extending pin 26, received in a radial hole 27 made in the shaft, as shown in FIG. 5, so as to hold the coupling firmly from slipping on the shafts.

In operative use, it is now evident that the split coupling can be assembled around the ends of the shafts, without disturbing either shaft position.

While various changes may be made in the detail constuction, it is understood that such changes will be within the spirit and scope of the present invention, as is defined by the appended claims.

What is claimed as new is:

1. A split coupling, comprising, in combination, a plurality of four semi-cylindrical members, a pair of sleeves, and a single, shock-absorbing shoe, for installation around nearby ends of two axially aligned shafts; two of said members being placed on opposite sides of each said shaft, and retained in position by one of said sleeves around said pair of members, said shoe being located between said shaft ends, a single tooth formed on one end of each said semi-cylindrical member; said shoe being made of a resilient rubber and including a circular central portion and a pair of oppositely extending teeth; said teeth of said semi-cylindrical members and said teeth of said shoe forming a cluster ringing around said circular central portion and being toothingly engaged together.

* * * * *